US012770810B2

(12) United States Patent
Schwartz

(10) Patent No.: US 12,770,810 B2
(45) Date of Patent: Oct. 20, 2026

(54) ACTUATOR SWITCH

(71) Applicant: Alps Alpine Co., Ltd., Tokyo (JP)

(72) Inventor: Allen K. Schwartz, Oxford, MI (US)

(73) Assignee: Alps Alpine Co., Ltd. (JP)

( * ) Notice: Subject to any disclaimer, the term of this patent is extended or adjusted under 35 U.S.C. 154(b) by 279 days.

(21) Appl. No.: 18/666,814

(22) Filed: May 17, 2024

(65) Prior Publication Data

US 2025/0357059 A1 Nov. 20, 2025

(51) Int. Cl.
*H01H 13/7057* (2006.01)
*H01H 13/18* (2006.01)

(52) U.S. Cl.
CPC ...... *H01H 13/7057* (2013.01); *H01H 13/186* (2013.01); *H01H 2300/01* (2013.01); *H01H 2300/012* (2013.01)

(58) Field of Classification Search
CPC .... H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 5,559,311 A * | 9/1996 | Gorbatoff | .............. H01H 13/70 200/1 B |
| 6,833,517 B2 | 12/2004 | Sotome et al. | |
| 7,262,375 B2 | 8/2007 | Sakai | |
| 2005/0190153 A1 * | 9/2005 | Ushimaru | .......... G05G 9/04796 345/161 |
| 2009/0058802 A1 | 3/2009 | Orsley | |

FOREIGN PATENT DOCUMENTS

| | | |
|---|---|---|
| JP | 2016-29645 A | 3/2016 |
| JP | 2022-165320 A | 10/2022 |

* cited by examiner

*Primary Examiner* — Ahmed M Saeed

(74) *Attorney, Agent, or Firm* — Harness, Dickey & Pierce, P.L.C.

(57) ABSTRACT

An actuator switch includes a first switch member is movable from an inactivated position to a first toggle position in a first direction and a second toggle position in a second direction and a third toggle position in a third direction transverse to the first and second directions and a fourth toggle position in a fourth direction opposite the third direction. A first switch member is movable from an inactivated position to a first position in an upward direction and a second position in a downward direction. A keypad includes a first group of two electrical contacts each associated with the second switch member and a second group of four electrical contacts each of which is associated with the first switch member.

20 Claims, 8 Drawing Sheets

| | | SW2 | | SW2 / SW1 | SW1 | | | |
|---|---|---|---|---|---|---|---|---|
| | | 1 | 2 | 7 | 3 | 4 | 5 | 6 |
| DRIVER WINDOW | UP | 1 | | | | | | |
| | XUP | 1 | | 1 | | | | |
| | DN | | 1 | | | | | |
| | XDN | | 1 | 1 | | | | |
| CO-DRIVER WINDOW | UP | 1 | | | 1 | | | |
| | XUP | 1 | | 1 | 1 | | | |
| | DN | | 1 | | 1 | | | |
| | XDN | | 1 | 1 | 1 | | | |
| LEFT REAR WINDOW | UP | 1 | | | | | 1 | |
| | XUP | 1 | | 1 | | | 1 | |
| | DN | | 1 | | | | 1 | |
| | XDN | | 1 | 1 | | | 1 | |
| RIGHT REAR WINDOW | UP | 1 | | | | | | 1 |
| | XUP | 1 | | 1 | | | | 1 |
| | DN | | 1 | | | | | 1 |
| | XDN | | 1 | 1 | | | | 1 |
| ALL WINDOW | UP | 1 | | | | 1 | | |
| | XUP | 1 | | 1 | | 1 | | |
| | DN | | 1 | | | 1 | | |
| | XDN | | 1 | 1 | | 1 | | |
| DOOR | LOCK | | | 1 | | | 1 | |
| | UNLOCK | | | 1 | | | | 1 |
| WINDOW | ALLOW | | | 1 | 1 | | | |
| | LOCKOUT | | | 1 | 1 | | | |
| CHILD LOCK | ALLOW | | | 1 | | 1 | | |
| | LOCKOUT | | | 1 | | 1 | | |

FIG. 4C

ACTUATOR SWITCH

FIELD

The present disclosure relates to an actuator switch for improved system performance and convenience.

BACKGROUND

This section provides background information related to the present disclosure which is not necessarily prior art.

A typical sedan uses a one 4-button driver door switch and three 1-button switches for the co-driver and two rear windows. Some manufactures include a separate rocker switch for door lock/unlock. Global vehicles designed for left hand/right hand drive markets may have an oversized co-driver switch of the same girth as the driver door switch to standardize the door trim.

With a 4-button driver's door switch, the driver may take their eyes off the road to find the button for the window he or she wishes to move up or down which increases the transaction time. If a user wishes, he or she may operate two buttons at the same time but it is impractical to raise/lower four windows at the same time which would be desirable in a convertible or when entering a car wash.

SUMMARY

This section provides a general summary of the disclosure, and is not a comprehensive disclosure of its full scope or all of its features.

The present disclosure provides a mechanism that when used for vehicle window lift systems may improve performance (primarily through reduced driver transaction time), bring new vehicle features (all window up/down and co-driver operation of rear windows), and incorporate other functions (door lock/unlock) while reducing cost and improving fitment.

The present disclosure provides a mechanism that may operate many different functions (e.g., nine functions) in as many as four different ways each using common parts for multiple vehicle windows. In some cases, the mechanism may provide for more than nine different functions or less than nine different functions.

In some examples, an actuator switch includes a first switch member movable from an inactivated position to a first position in an upward direction and a second position in a downward direction. A second switch member may surround the first switch member and may be movable from an inactivated position to a first toggle position in a first direction and a second toggle position in a second direction and a third toggle position in a third direction transverse to the first and second directions and a fourth toggle position in a fourth direction opposite the third direction. A keypad may include a first group of two electrical contacts each associated with the first switch and a second group of four electrical contacts each of which may be associated with the second switch member.

According to a further aspect of the present disclosure, the first group of two electrical contacts may be staggered double pole single throw electrical contacts.

According to a further aspect of the present disclosure, the second group of four electrical contacts may be staggered double pole single throw electrical contacts.

According to a further aspect of the present disclosure, the first switch member may be pivotally mounted within a chamber of the second switch member.

According to a further aspect of the present disclosure, the second switch member may be pivotally supported on a pivot mounted to a housing.

According to a further aspect of the present disclosure, the keypad may be mounted to a printed wiring board and the pivot is mounted to a post that extends through an opening in the printed circuit board.

According to a further aspect of the present disclosure, the pivot may be one of spherical, partially spherical, spheroid or partially spheroid and includes four trunnions that are received in corresponding guide slots in the second switch member.

According to a further aspect of the present disclosure, the keypad may be mounted to a printed wiring board.

According to a further aspect of the present disclosure, the first group of two electrical contacts may be on a first side of the printed wiring board and the second group of four electrical contacts may be on a second side of the printed wiring board.

According to a further aspect of the present disclosure, a lower housing may include a pair of pivot supports and an actuator having a pivot shaft is pivotally mounted to the pair of pivot supports, the actuator may include a pair of contactor arms one of which is pivotable to engage one of the two electrical contacts and a second one of which is pivotable to engage a second one of the two electrical contacts.

According to a further aspect of the present disclosure, the first switch may engage a lever arm extending from the pivot shaft of the actuator.

According to a further aspect of the present disclosure, the keypad may be mounted to a printed wiring board and the lever arm may extend through an opening through the printed wiring board.

According to another aspect, an actuator switch may include a first switch member movable from an inactivated position to a first position in an upward direction and a second position in a downward direction. A second switch member may surround the first switch member and may be movable from an inactivated position to a first toggle position in a first direction, a second toggle position in a second direction, a third toggle position in a third direction transverse to the first and second directions, and a fourth toggle position in a fourth direction opposite the third direction. A keypad may include a first group of two double pole single throw electrical contacts each associated with the first switch and a second group of four double pole single throw electrical contacts each of which is associated with the second switch member, wherein the first switch member may be pivotally mounted within a chamber of the second switch member.

Further areas of applicability may become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 4C is a table of actuation states of a transversely pivoting actuator switch according to the principles of the present disclosure;

Corresponding reference numerals indicate corresponding parts throughout the several views of the drawings.

DETAILED DESCRIPTION

Example embodiments will now be described more fully with reference to the accompanying drawings.

For purposes of this disclosure, the term "aligned" may generally refer to being parallel, substantially parallel, or forming an angle of less than 35.0 degrees. For purposes of this disclosure, the term "transverse" may generally refer to perpendicular, substantially perpendicular, or forming an angle between 55.0 and 125.0 degrees. For purposes of this disclosure, the term "length" may generally refer to the longest dimension of an object. For purposes of this disclosure, the term "width" may generally refer to the dimension of an object from side to side and may refer to measuring across an object perpendicular to the object's length. For purposes of this disclosure, the term "pole" may generally refer to a moving contact arm. For purposes of this disclosure, the term "throw" may generally refer to a fixed contact. For purposes of this disclosure, the term "staggered" may generally refer to when two or more contacts are made in a sequence.

Figure 1:
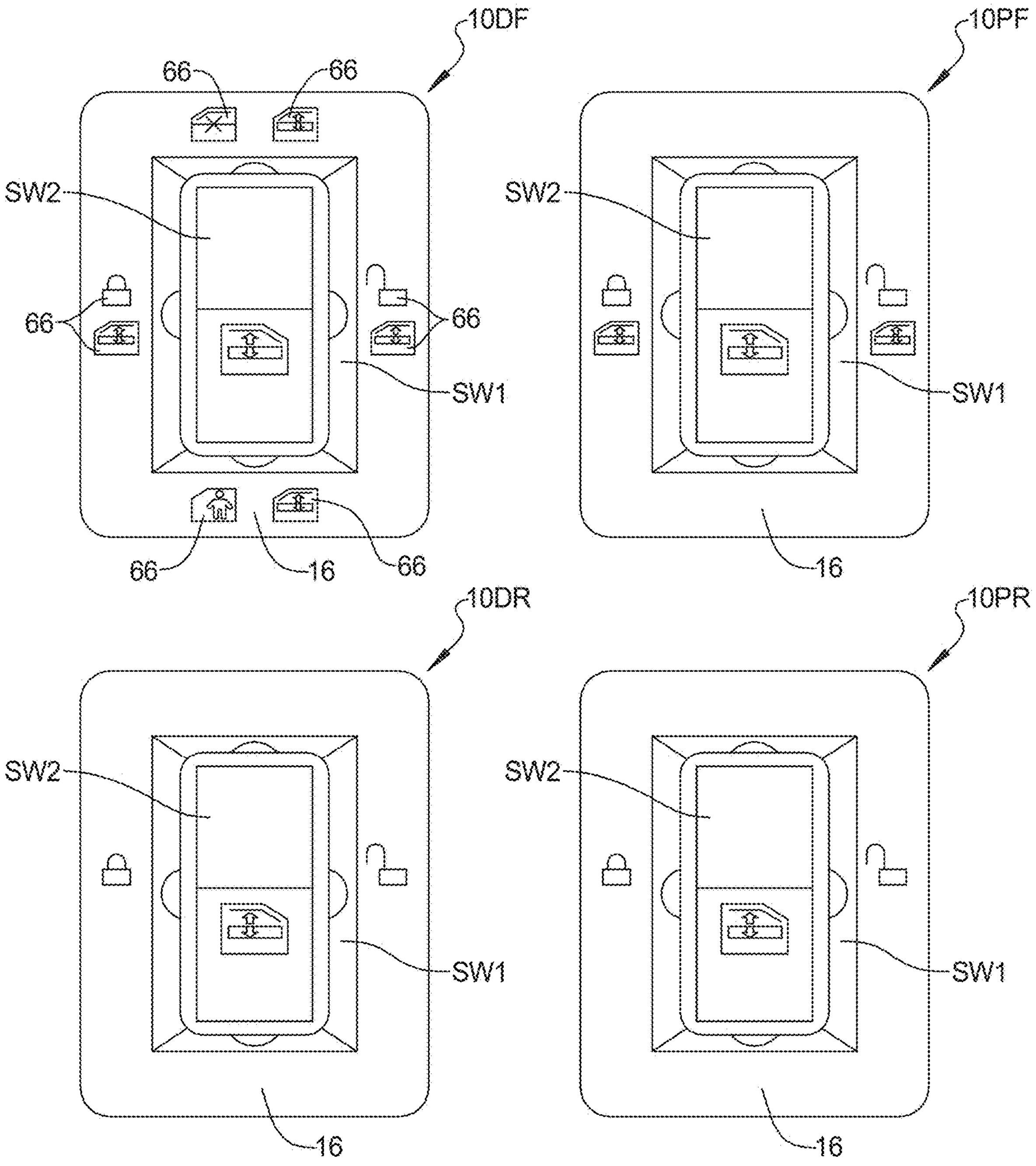
FIG. 1 is a schematic view illustrating example operation features of four window lift switches of an exemplary vehicle with a vehicle ignition on according to the principles of the present disclosure.
Figure 4A:
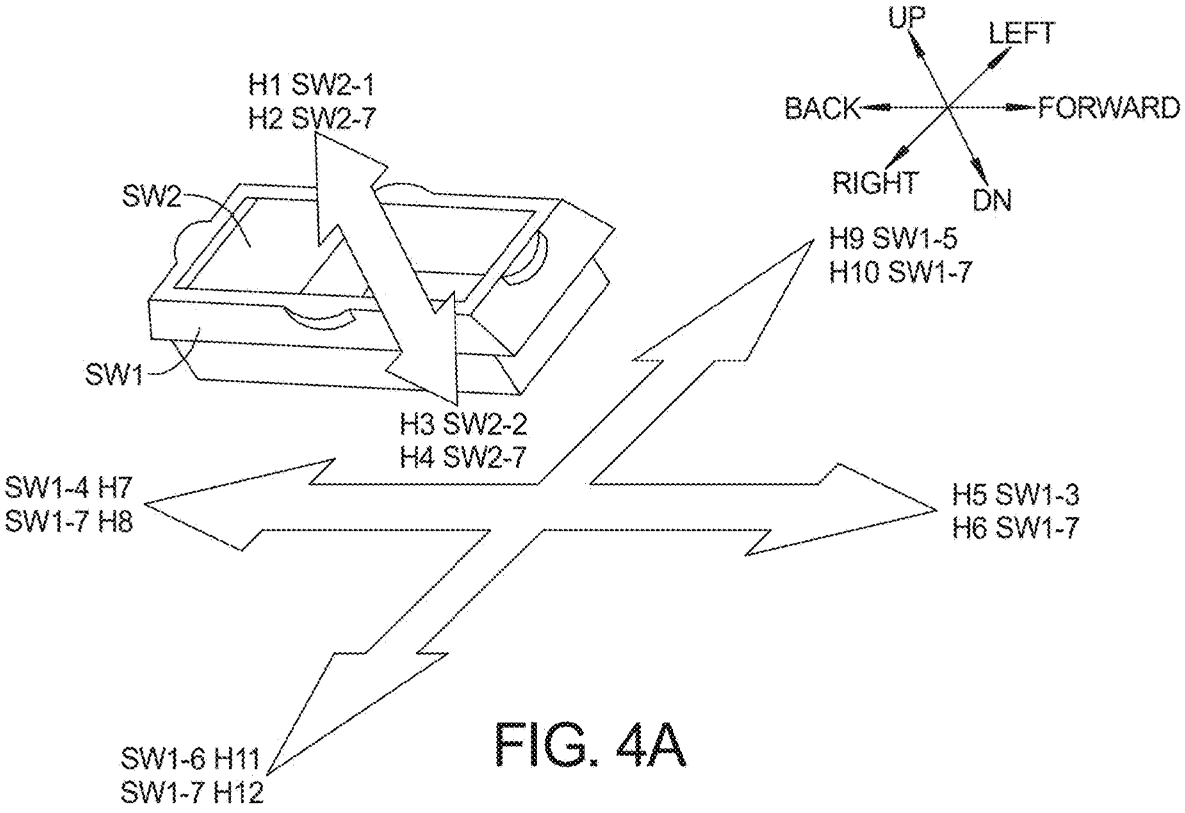
FIG. 4A is a perspective view of a transversely pivoting actuator switch showing actuation directions of first and second switches of the transversely pivoting actuator switch according to the principles of the present disclosure.

With reference to FIG. 1, and by way of non-limiting example, four transversely pivoting window lift switches 10DF, 10PF, 10DR and 10PR are shown each including a first switch member SW1 and a second switch member SW2 disposed within a recessed cavity of the first switch member SW1 which is surrounded by a cover 16. In the case of a four door vehicle, each door may include a window lift switch. The driver side front window switch 10DF may include nine operating modes as detailed in the Table of FIG. 4C. As shown in FIG. 4A, the first switch SW1 is pivotable forward, backward, left and right. The second switch SW2 is pivotable forward and backward. In addition, each direction of operation of the first switch SW1 and the second switch SW2 may include a staggered double pole single throw electrical contact. In particular, each switch operation direction has two activation functions, a first of which is activated by an initial activation distance and a second of which is activated by a further activation distance. It is further noted that the position 7 in the table of FIG. 4C is achieved by the simultaneous activation of switch SW1 and switch SW2.

Figure 4B:
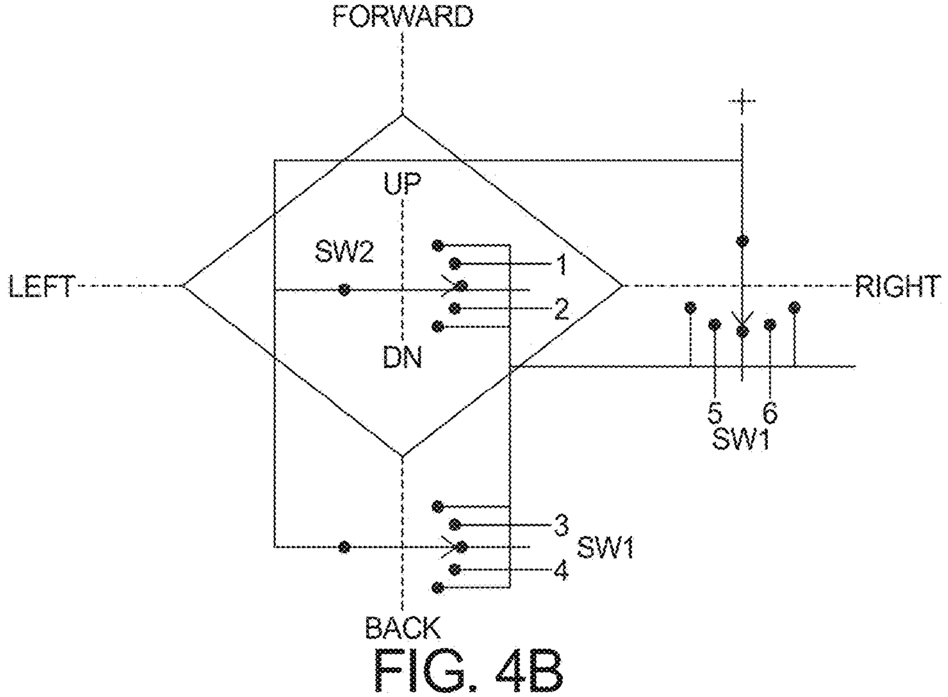
FIG. 4B is a schematic view of an actuator electronic circuit according to the principles of the present disclosure.
Figure 5:
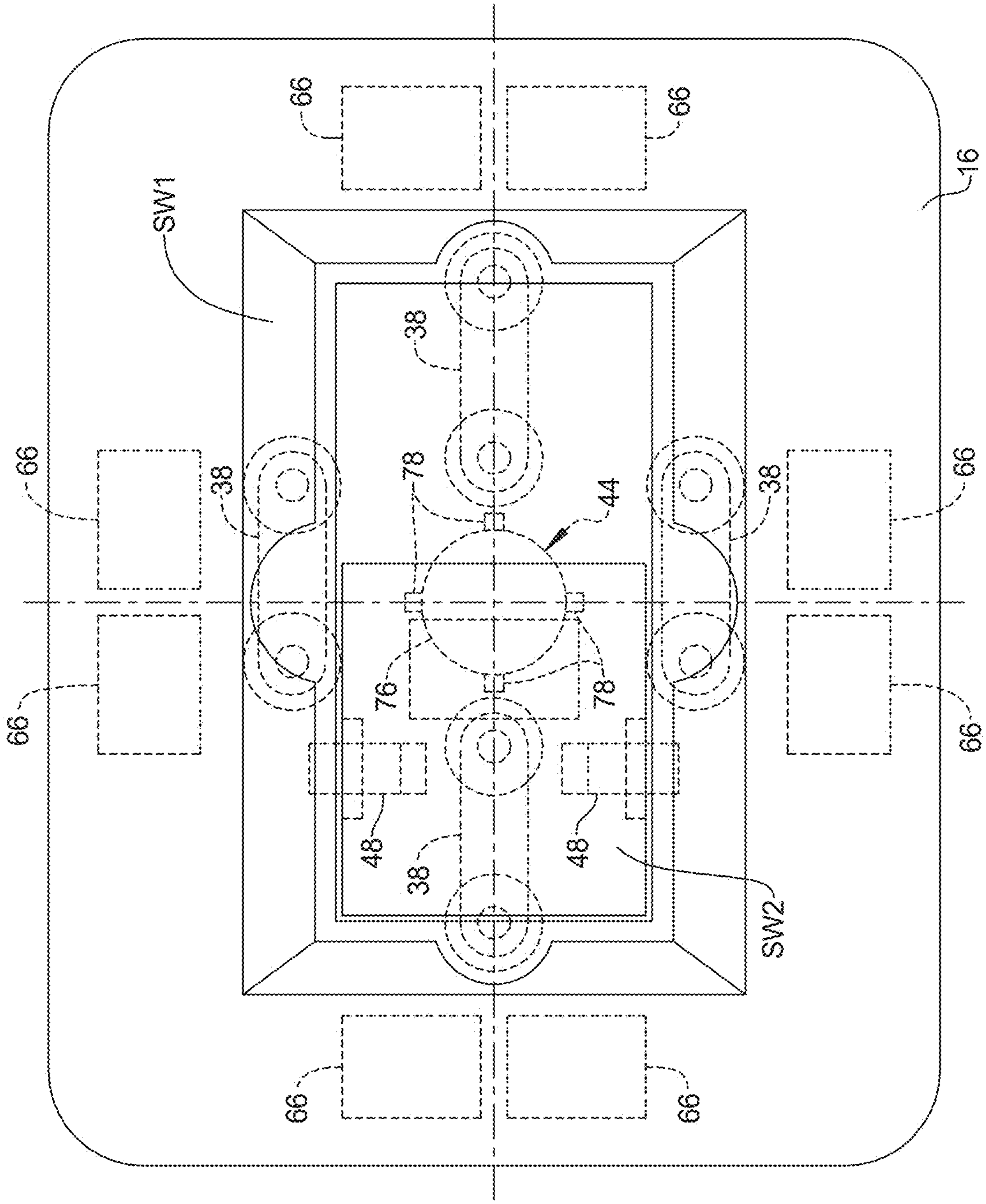
FIG. 5 is a top plan view of a transversely pivoting actuator switch and illustrating internal components thereof according to the principles of the present disclosure.
Figure 6:
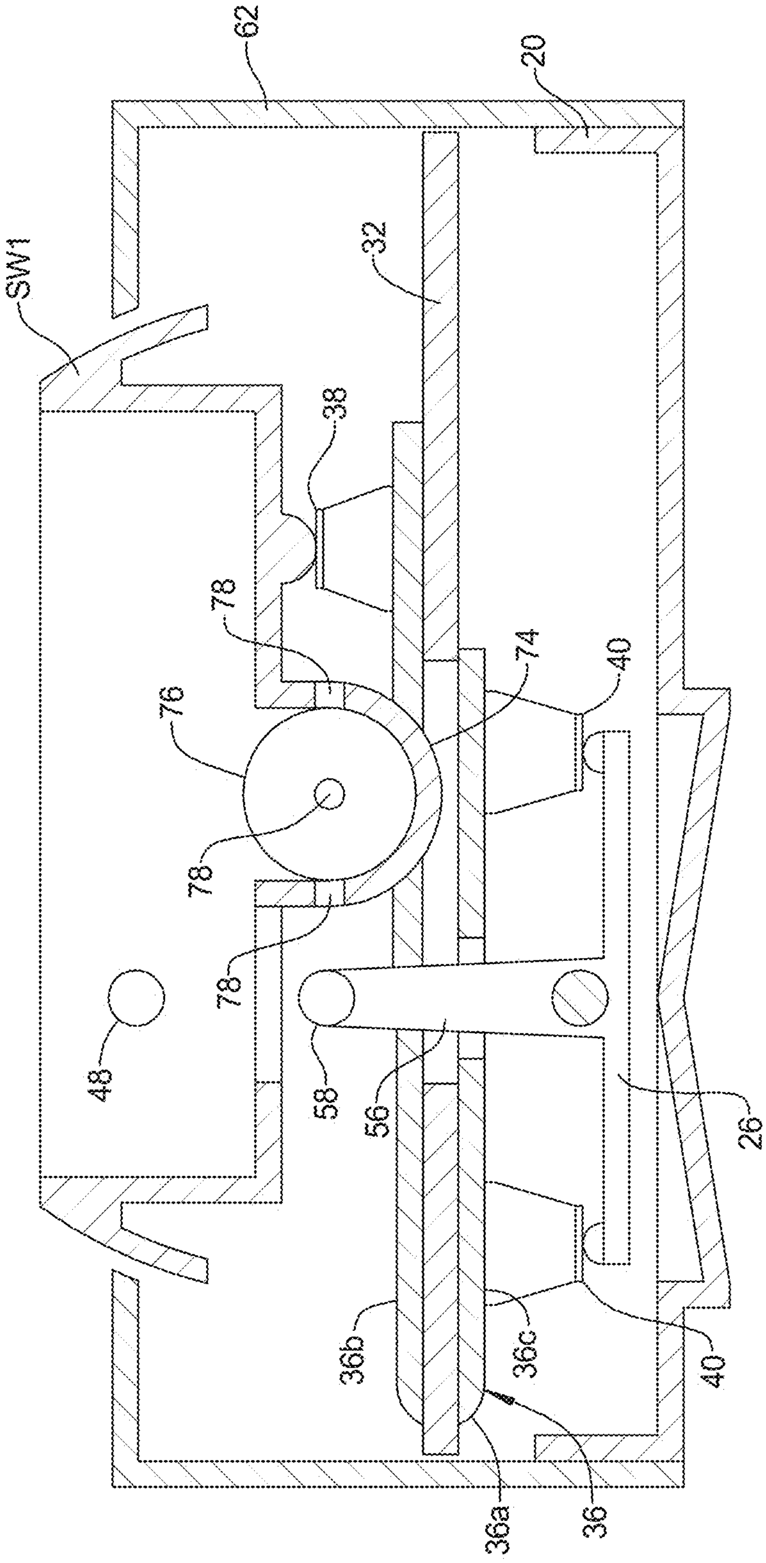
FIG. 6 is a side plan view of a transversely pivoting actuator switch and illustrating internal components thereof with certain elements omitted for illustrative purposes according to the principles of the present disclosure.
Figure 7:
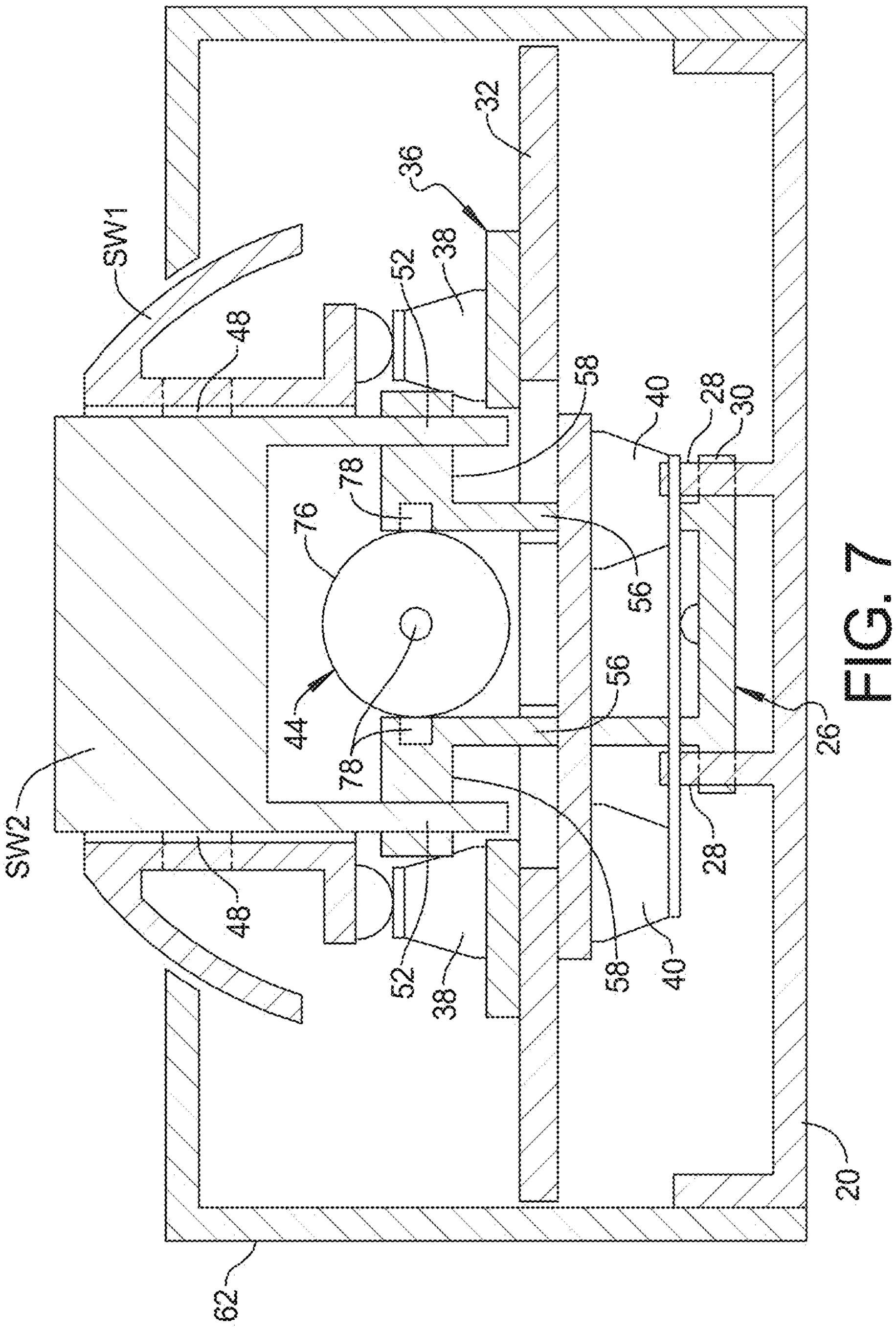
FIG. 7 is an end plan view of a transversely pivoting actuator switch and illustrating internal components thereof with certain elements omitted for illustrative purposes according to the principles of the present disclosure.

As shown on the cover 16 in FIG. 1, the first switch SW1 may be activated left an initial amount (position 5 in FIG. 4B) to activate the second switch SW2 to control the left rear window and the switch SW1 may be activated left a further distance (beyond position 5 in FIG. 4B) to lock the doors. The second switch SW2 may be simultaneously operated backward to an initial position (position 1 in FIG. 4B) to raise the left rear window and may be simultaneously operated a further distance (beyond position 1 in FIG. 4B) to operate the left rear window automatically all the way up. The second switch SW2 may be simultaneously operated forward to an initial position (position 2 in FIG. 4B) to lower the left rear window and may be simultaneously operated a further distance (beyond position 2 in FIG. 4B) to operate the left rear window automatically all the way down.

As shown on the cover 16 in FIG. 1, the first switch SW1 may be activated right an initial amount (position 6 in FIG. 4B) to activate the second switch SW2 to control the right rear window and the switch SW1 may be activated left a further distance (beyond position 6 in FIG. 4B) to unlock the doors. The second switch SW2 may be simultaneously operated backward to an initial position (position 1 in FIG. 4B) to raise the right rear window and may be simultaneously operated a further distance (beyond position 1 in FIG. 4B) to operate the right rear window automatically all the way up. The second switch SW2 may be simultaneously operated forward to an initial position (position 2 in FIG. 4B) to lower the right rear window and may be simultaneously operated a further distance (beyond position 2 in FIG. 4B) to operate the right rear window automatically all the way down.

As shown on the cover 16 in FIG. 1, the first switch SW1 may be activated forward an initial amount (position 3 in FIG. 4B) to activate the second switch SW2 to control the right front window and the switch SW1 may be activated forward a further distance (beyond position 3 in FIG. 4B) to lockout all windows except the driver door. The second switch SW2 may be simultaneously operated backward to an initial position (position 1 in FIG. 4B) to raise the left front window and may be simultaneously operated a further distance (beyond position 1 in FIG. 4B) to operate the left front window automatically all the way up. The second switch SW2 may be simultaneously operated forward to an initial position (position 2 in FIG. 4B) to lower the left front window and may be simultaneously operated a further distance (beyond position 2 in FIG. 4B) to operate the left front window automatically all the way down.

As shown on the cover 16 in FIG. 1, the first switch SW1 may be activated rearward an initial amount (position 4 in FIG. 4B) to activate the second switch SW2 to control multiple windows simultaneously and the switch SW1 may be activated forward a further distance (beyond position 4 in FIG. 4B) to prevent the rear unlock switches from operating. The second switch SW2 may be simultaneously operated backward to an initial position (position 1 in FIG. 4B) to raise all the windows and may be simultaneously operated a further distance (beyond position 1 in FIG. 4B) to operate multiple windows automatically all the way up. The second switch SW2 may be simultaneously operated forward to an initial position (position 2 in FIG. 4B) to lower multiple windows and may be simultaneously operated a further distance (beyond position 2 in FIG. 4B) to operate multiple windows automatically all the way down.

The second switch SW2 may be solely operated backward to an initial position (position 1 in FIG. 4B) to raise the front left window and may be operated a further distance (beyond position 1 in FIG. 4B) to operate the front left window automatically all the way up. The second switch SW2 may be operated forward to an initial position (position 2 in FIG. 4B) to lower the front left window and may be operated a further distance (beyond position 2 in FIG. 4B) to operate the front left window automatically all the way down.

Figure 2:
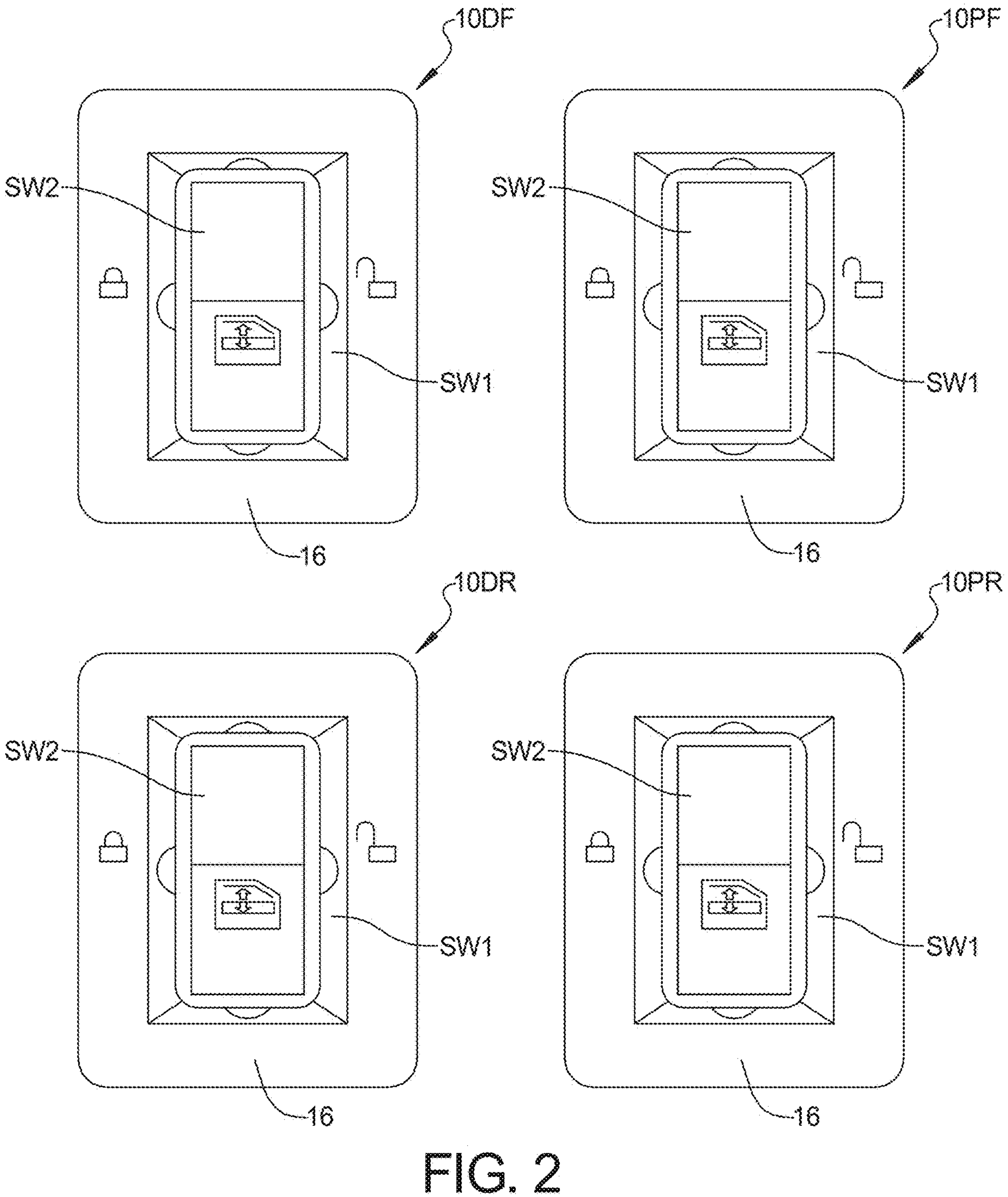
FIG. 2 is a schematic view illustrating example operation features of four window lift switches of an exemplary vehicle with a vehicle ignition off according to the principles of the present disclosure.

In some examples, the icons may be turned on when the vehicle is turned on, and the icons may be turned off when the vehicle is turned off. However, in some examples, the icons are displayed regardless of the state of the vehicle. For example, the icons may be permanently printed on the surfaces. FIG. 2 depicts one example where the icons may be selectively displayed. In this illustrated example, the operating modes of the switches 10DF, 10PF, 10DR and 10PR are shown when the vehicle ignition switch is off. In this example, only the door lock and unlock operating modes are active when the ignition switch is off. The SW2 icon is also visible with ignition off.

Figure 3:
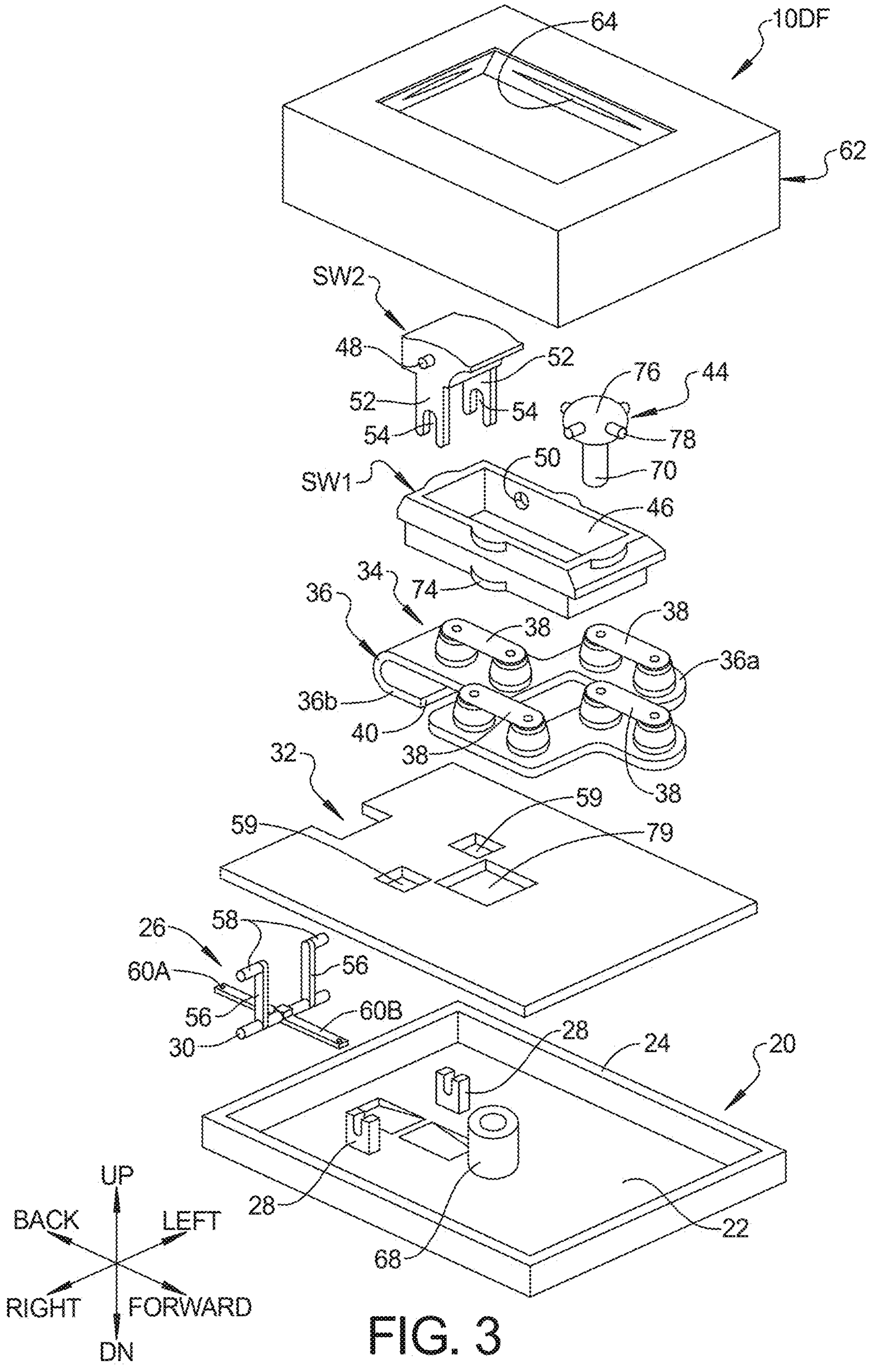
FIG. 3 is an exploded perspective view of an example transversely pivoting actuator switch according to the principles of the present disclosure.

With reference to FIG. 3, an exploded perspective view of an example transversely pivoting actuator switch 10DF according to the principles of the present disclosure is disclosed. The switch 10DF includes a lower housing 20 having a base 22 and a sidewall 24. An actuator 26 includes a pivot shaft 30 pivotally mounted to a pair of pivot supports 28 of the lower housing 20. A printed wiring board 32 is mounted above the base 22 of the lower housing 20. A keypad 34 is mounted to the printed wiring board 32. The keypad 34 includes a substrate 36 and four upper staggered double pole single throw electrical contactors 38 mounted to an upper portion 36*b* of the substrate 36 and two lower staggered double pole single throw electrical contactors 40 mounted to a lower portion 36*c* of the substrate 36. The contactors 38 and 40 are connected to the printed wiring board 32.

The first switch SW1 is mounted above the four upper double pole single throw electrical contactors 38. The first switch SW1 is pivotally supported by a pivot 44 that is mounted to the base 22 of the lower housing 20. The second switch SW2 is pivotally mounted within a cavity 46 in the first switch SW1. The second switch SW2 includes a pair of pivots 48 that are received in apertures 50 in the sidewalls of the cavity 46. The second switch SW2 further includes a pair of engagement arms 52 each with an engagement slot 54. The pair of engagement arms 52 each engage a respective one of a pair of lever arms 56 of the actuator 26. In particular, the pair of lever arms 56 each include a laterally extending shaft 58 that are received in the engagement slot 54 of the engagement arms of the second switch SW2. The pair of lever arms 56 may each extend through a respective opening 59 in the printed wiring board 32. The actuator 26 includes a pair of contactor arms 60A, 60B one of which 60A is pivotable to engage one of the two lower staggered double pole single throw electrical contactors 40 and a second one of which 60B is pivotable to engage a second one of the two lower staggered double pole single throw electrical contactors 40.

An upper cover 62 is mounted to the lower housing 20 and includes an opening 64 that receives the first switch SW1. The upper cover 62 may include indicia 66 indicating the operating states of the switch 10DF.

The lower housing 20 contains a boss 68 that receives a post 70 of the pivot 44. The base 22 of the lower housing may further include recesses 72A, 72B that receive the contactor arms 60A, 60*b* of the actuator 26 when the actuator 26 is pivoted. The recesses 72A, 72B are on opposite sides of the pivot supports 28. The lower housing 20 further includes the sidewall and/or other structure to align the printed circuit board 32 and may include snaps to hold the switch assembly together.

The post 70 of the pivot 44 assembles through an opening in a button well 74 is formed in a bottom of the first switch SW1 and into the boss 68 of the lower housing. The post 70 may be secured in the boss 68 by a screw, adhesive, heat staking, press fit, or other known fastening technique. The pivot may include a head portion 76 that is one of spherical, partially spherical, spheroid, or partially spheroid and may include four trunnions 78 that are received in corresponding guide slots in the second switch member to guide the fore and aft and transverse motion of the first switch SW1. The post 70 of the pivot may extend through an opening 79 in the printed wiring board 32.

The substrate 36 of the keypad 34 has a bend portion 36*a* for defining a first upper portion 36*b* disposed between the printed circuit board 32 and the first switch SW1 and a second lower portion 36*c* disposed between the printed circuit board 32 and the actuator 26 providing two layers of electrical circuitry. The printed circuit board 32 registers the keypad 34 and contains the switch electronics.

The second switch SW2 pivots within the cavity of the first switch SW1 and drives the actuator 26 to depress the two electrical contactors 40 of the second lower portion 36*c* of the keypad 34. The actuator 26 interfaces between the second switch SW2 and the two electrical contactors 40 of the second lower portion 36*c* of the keypad 34 to provide up to four operating signals.

The first switch SW1 pivots about the head 76 of the pivot 44 to engage the four upper staggered double pole single throw electrical contactors 38 on the first portion 36*b* of the substrate 36 to provide either operating functions (two in each of four directions).

The cover 62 maintains the assembly of the switch 10DF and may include lightable areas for the operation icons 66.

The keypad 34 provides a preload against the first switch SW1 at four transverse points 12 mm away from the pivot 44 or at another suitable distance. Each of the six keypad electrical contactors 38, 40 utilizes two elastomer dome based electrical contacts with a tie bar such that force is applied at one third the distance between dome centers. This embodiment may yield a stepped haptic where the first switch SW1 may be rotated to a first position, such as at 7 degrees (or another suitable amount) and comfortably stopped or the operator may continue rotation with additional force to a second position, such as at a total of 12 degrees (or another suitable amount). When the operator stops at the first position, the tier 2 electrical functions may be realized by operating the second switch SW2. When the operator rotates the first switch SW1 to the second position the tier 3 electrical functions may be activated. In some examples, operating the second switch SW2 at the tier 3 level does nothing. In such an example, when the second switch SW2 is operated with no rotation of the first switch SW1, the tier 1 function occurs (window up/down of the door in which the switch is located).

The actuator 26 similarly interfaces with the second switch SW2 to provide a stepped haptic for the second switch SW2 rotation.

In the case of the vehicle driver, one may find and rotate the second switch SW2 to raise or lower the driver window without taking their eyes off the road. In some cases, of a user wishes, he or she may raise or lower the front passenger window, the left rear window, the right rear window, or in this embodiment all four windows, by rotating the first switch SW1 to the tier 2 position and activating the second switch SW2. In some cases, of a user wishes to activate any of the tier 3 functions, he or she may rotate the first switch SW1 to that tier 3 position. The cover 62 may have a combination of dead front and white icons for a clean appearance and to provide a focus on any functions that may be operated with the ignition off.

The front passenger switch 10PF may also operate up to three tiers of functions with the front passenger window, the left rear window, the right rear window and the door lock/unlock shown in this embodiment. In some cases, the driver door switch 10DF may have an option to select priority and/or to limit the functions available to the front passenger (Window Lock out).

The functions available to the rear window switches 10DR, 10PR may be limited just to the appropriate window and door lock/unlock functions.

In some cases, at least some of the switches 10DF, 10PF, 10DR and 10PR are the same size and/or share parts for improved fitment especially with left hand drive/right hand drive vehicles. Replaceable inserts in molds may be used to limit the first switch SW1 or second switch SW2 rotation possibilities while maintaining economy of scale.

Another embodiment may replace the elastomer domes and tie bar with a spring and plunger arrangement. In such an example, the plunger and/or spring may be located within a post that cams a contact wiper. The contact wiper may incorporate sliding electrical contacts and a detent profile for both the first switch SW1 and the second switch SW2 separately or as one.

The principles described above may be used for other vehicle functions such as an outside rear view mirror (OSRVM) switch where the second switch SW2 is replaced with a left/right mirror rocker and tier 2 circuits perform left or right OSRVM functions (up_down_in_out) depending on button position and fold/unfold, heated mirror and trailer mirror extend_retract with tier 3 circuits without the second switch SW2 actuation.

The actuator switch 10 of the present disclosure may, for example, be used to control vehicle windows, door locks, child lockout, window lockout, outside rear view mirrors, the overhead mirror, light switches, trunk latch, rear hatch control, on-board audio and visual entertainment, HVAC controls, other vehicle accessories and various combinations thereof. The actuator switch may be used to control window up-down and express window up-down for each individual window and for multiple windows simultaneously. With regard to mirror control, the actuator switch 10 of the present disclosure may be used to control the left, right or overhead mirror up, down, left, right, fold, heat, mirror day/night, chromaticity on/off and/or trailer mirror extend/retract. With regard to light controls, the actuator switch 10 may be used to control headlight parklight on/off/auto, panel lamp intensity, ambient light intensity, dome lamp on/off, headlamp leveling, front and rear fog lamps on/off and blackout lamps off. The first switch SW1 and the second switch SW2 work together with up to eight operating positions (2 fore, 2 aft, 2 left and 2 right) for the first switch and up to four operating positions (2 fore and 2 aft) for the second switch SW2.

While the principles herein have been described with reference to vehicles, the principles described herein may be used in any appropriate vehicles or other application. For example, the principles described herein may be used in cars, sedans, trucks, vans, mini-vans, trikes, off-road vehicles, boats, chairs, gaming chairs, airplanes, another type of vehicle, another type of application, or combinations thereof.

It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” may encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and may be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An actuator switch, comprising:

a keypad including a first group of four electrical contacts and a second group of two electrical contacts;

a first switch member associated with the first group of four electrical contacts and movable from an inactivated position to a first toggle position in a first direction relative to the keypad and a second toggle position in a second direction relative to the keypad and a third toggle position in a third direction transverse to the first and second directions and a fourth toggle position in a fourth direction opposite the third direction; and a second switch member supported by the first switch member and movable from an inactivated position to a first position in an upward direction and a second position in a downward direction, wherein the first switch member is pivotally supported on a pivot mounted to a housing, and the keypad is mounted to a printed wiring board and the pivot is mounted to a post that extends through an opening in the printed circuit board.

2. The actuator switch according to claim 1, wherein the second group of two electrical contacts are staggered double pole single throw electrical contacts.

3. The actuator switch according to claim 1, wherein the first group of four electrical contacts are staggered double pole single throw electrical contacts.

4. The actuator switch according to claim 1, wherein the second switch member is pivotally mounted within a chamber of the first switch member.

5. The actuator switch according to claim 1 wherein the pivot is one of spherical, partially spherical, spheroid or partially spheroid and includes four trunnions that are received in corresponding guide slots in the first switch member.

6. The actuator switch according to claim 1, wherein the keypad is mounted to the printed wiring board.

7. The actuator switch according to claim 6, wherein the first group of two electrical contacts are on a first side of the printed wiring board and the second group of four electrical contacts are on a second side of the printed wiring board.

8. The actuator switch according to claim 1, further comprising a lower housing having a pair of pivot supports; and an actuator having a pivot shaft pivotally mounted to the pair of pivot supports, the actuator including a pair of contactor arms one of which is pivotable to engage one of the two electrical contacts and a second one of which is pivotable to engage a second one of the two electrical contacts.

9. The actuator switch according to claim 8, wherein the second switch engages a lever arm extending from the pivot shaft of the actuator.

10. The actuator switch according to claim 9, wherein the keypad is mounted to the printed wiring board and the lever arm extends through an opening through the printed wiring board.

11. An actuator switch, comprising:

a keypad including a first group of four double pole single throw electrical contacts and a second group of two double pole single throw electrical contacts;

a first switch member associated with the first group of four double pole single throw electrical contacts and movable from an inactivated position to a first toggle position in a first direction relative to the keypad and a second toggle position in a second direction opposite the first direction and a third toggle position in a third direction transverse to the first and second directions and a fourth toggle position in a fourth direction opposite the third direction; and a second switch member associated with the first group of four double pole single throw electrical contacts and supported by the first switch member and movable from an inactivated position to a first position in an upward direction and a second position in a downward direction, wherein the first switch member is pivotally supported on a pivot mounted to a housing, and the keypad is mounted to a printed wiring board and the pivot is mounted to a post that extends through an opening in the printed circuit board.

12. The actuator switch according to claim 11, wherein the pivot is one of spherical, partially spherical, spheroid or partially spheroid and includes four trunnions that are received in corresponding guide slots in the first switch member.

13. The actuator switch according to claim 11, wherein the keypad is mounted to the printed wiring board.

14. The actuator switch according to claim 13, wherein the first group of two electrical contacts are on a first side of the printed wiring board and the second group of four electrical contacts are on a second side of the printed wiring board.

15. The actuator switch according to claim 11, further comprising a lower housing having a pair of pivot supports; and an actuator having a pivot shaft pivotally mounted to the pair of pivot supports, the actuator including a pair of contactor arms one of which is pivotable to engage one of the two electrical contacts and a second one of which is pivotable to engage a second one of the two electrical contacts.

16. The actuator switch according to claim 15, wherein the second switch engages a lever arm extending from the pivot shaft of the actuator.

17. An actuator switch, comprising:

a keypad including a first group of four electrical contacts and a second group of two electrical contacts;

a first switch member associated with the first group of four electrical contacts and movable from an inactivated position to a first toggle position in a first direction relative to the keypad and a second toggle position in a second direction relative to the keypad and a third toggle position in a third direction transverse to the first and second directions and a fourth toggle position in a fourth direction opposite the third direction;

a second switch member supported by the first switch member and movable from an inactivated position to a first position in an upward direction and a second position in a downward direction;

a lower housing having a pair of pivot supports; and an actuator having a pivot shaft pivotally mounted to the pair of pivot supports, the actuator including a pair of contactor arms one of which is pivotable to engage one of the two electrical contacts and a second one of which is pivotable to engage a second one of the two electrical contacts.

18. The actuator switch according to claim 17, wherein the second group of two electrical contacts are staggered double pole single throw electrical contacts.

19. The actuator switch according to claim 17, wherein the first group of four electrical contacts are staggered double pole single throw electrical contacts.

20. The actuator switch according to claim 17, wherein the second switch member is pivotally mounted within a chamber of the first switch member.

* * * * *